(12) United States Patent
Samid

(10) Patent No.: US 11,212,097 B2
(45) Date of Patent: Dec. 28, 2021

(54) MIXED UNARY CRYPTOGRAPHY

(71) Applicant: Gideon Samid, Rockville, MD (US)

(72) Inventor: Gideon Samid, Rockville, MD (US)

( * ) Notice: Subject to any disclaimer, the term of this patent is extended or adjusted under 35 U.S.C. 154(b) by 0 days.

(21) Appl. No.: 17/323,908

(22) Filed: May 18, 2021

(65) Prior Publication Data

US 2021/0281407 A1    Sep. 9, 2021

Related U.S. Application Data (63) Continuation-in-part of application No. 16/821,944, filed on Mar. 17, 2020, now Pat. No. 11,038,668, which is a continuation-in-part of application No. 14/714,328, filed on May 17, 2015, now Pat. No. 10,608,814.

(60) Provisional application No. 62/850,720, filed on May 21, 2019, provisional application No. 62/857,898, filed on Jun. 6, 2019, provisional application No. 62/900,567, filed on Sep. 15, 2019, provisional application No. 62/926,560, filed on Oct. 27, 2019, provisional application No. 62/931,807, filed on Nov. 7, 2019, provisional application No. 62/693,855, filed on Jan. 21, 2020, provisional application No. 63/034,401, filed on Jun. 4, 2020, provisional application No. 63/051,652, filed on Jul. 14, 2020, provisional application No. 63/140,006, filed on Jan. 21, 2021.

(51) Int. Cl.
*H04L 9/14*    (2006.01)
*H04L 9/08*    (2006.01)

(52) U.S. Cl.
CPC .............. *H04L 9/14* (2013.01); *H04L 9/0869* (2013.01)

(58) Field of Classification Search
None
See application file for complete search history.

(56) References Cited

U.S. PATENT DOCUMENTS

| | | | |
|---|---|---|---|
| 2013/0135258 A1* | 5/2013 | King | G06F 3/0428 345/175 |
| 2016/0344707 A1* | 11/2016 | Philipp | H04L 63/06 |
| 2020/0125501 A1* | 4/2020 | Durham | H04L 9/0861 |

OTHER PUBLICATIONS

Fridrich et al., Invertible Authentication, 2001, SPIE 4314, Security and Watermarking of Multimedia Contents III, pp. 197-208 (Year: 2001).*
Jiang et al., Watermarking Road Maps against Corp and Merge Attacks, 2013, IH&MMsec'13, Montpellier, France, pp. 221-230. ( Year: 2013).*

* cited by examiner

*Primary Examiner* — Luu T Pham
*Assistant Examiner* — Edward X Long (57) ABSTRACT

A stream of plaintext is marked per its more sensitive parts. These marked parts are being encrypted via mathematically secure ciphers for which the ciphertext may be much larger than the plaintext. This invention creates a mix of size-preserving encryption for the not so sensitive parts of the plaintext, and size-enlarging encryption for the marked parts, thereby security is served without the inconvenience of a very long ciphertext.

1 Claim, 3 Drawing Sheets

MIXED UNARY CRYPTOGRAPHY

Continuation in Part Of U.S. patent application Ser. No. 16/821,944 filed Mar. 17, 2020

This application is also a continuation in part of U.S. patent application Ser. No. 14/714,328 filed May 17, 2015.

CROSS REFERENCE TO RELATED APPLICATIONS

Provisional Applications Provisional Application #62850720, filed May 21, 2019; Provisional Application No. 62/857,898 filed 6 Jun. 2019; Provisional Application No. 62/900,567 filed Sep. 15, 2019, Provisional Application No. 62/926,560 filed Oct. 27, 2019; Provisional Application No. 62/931,807 filed Nov. 7, 2019; Provisional Application 62/963,855 filed Jan. 21, 2020.

Provisional Application No. 63/034,401 filed Jun. 4 2020, Provisional Application No. 63/051,652, file Jul. 14, 2020, Provisional Application No. 63/140,006 filed Jan. 21, 2021.

BRIEF SUMMARY OF THE INVENTION

The Unary cipher offers a unique feature—a non-committed ciphertext—at the price of a larger size ciphertext. While in many circumstances a large size ratio between the ciphertext and the plaintext is not a big issue, in other cases, it may pose a problem, especially if the ciphertext is much larger than the plaintext. Proposing here a mitigating solution based on the notion of 'sensitivity distribution': a typical message is comprised of highly sensitive parts and not so sensitive parts. Designing a procedure whereby the sensitive parts will be protected by the highly secure non-committed ciphertext generated by the Unary cipher (or equivalent), and the rest will be protected via a size-preserving cipher.

STATEMENT REGARDING FEDERALLY SPONSORED RESEARCH OR DEVELOPMENT

Not Applicable.

REFERENCE TO SEQUENCE LISTING, A TABLE, OR A COMPUTER PROGRAM LISTING COMPACT DISK APPENDIX

Not Applicable.

BACKGROUND OF THE INVENTION

Cryptography is gearing up to face the threat of quantum computing. One robust strategy to face this threat is to construct ciphertexts that don't commit to their generating plaintext. Such ciphers may require a ciphertext which is so much larger than its generating plaintext that the operation is too sticky. One is searching for a means to deploy such ciphertext-enlarging quantum safe ciphers while keeping the size of the ciphertext within bounds. This is the challenge addressed by this invention.

Overview: The Unary cipher offers a unique feature—a non-committed ciphertext—at the price of a larger size ciphertext. While in many circumstances a large size ratio between the ciphertext and the plaintext is not a big issue, in other cases, it may pose a problem, especially if the ciphertext is much larger than the plaintext. Proposing here a mitigating solution based on the notion of 'sensitivity distribution': a typical message is comprised of highly sensitive parts and not so sensitive parts. Designing a procedure whereby the sensitive parts will be protected by the highly secure non-committed ciphertext generated by the Unary cipher (or equivalent), and the rest will be protected via a size-preserving cipher.

Terms and Names

The term TEAM cipher or TEAM cryptography used in the continued application may be used synonymously with the term Unary Cipher or Unary cryptography. The term Unarization will be used to refer to representing a bit string in the way described here where the numeric value of a string and its leading zeros are represented by counted bits of same identity. A so 'unarized' string is first non-encrypted, just a different representation of a bit string, but when transposed with some transposition key the unarized string becomes a transposed unarized string. Normally from the contents of the text it is readily clear if the term unarized string refers to the pre-encrypted (pre-transposed) string or to the encrypted (transposed) string. Whenever the Mixed Unary procedure described herein refers to Unary Encryption it can equally well refer to any cipher generating an oversize ciphertext.

Figure 1:
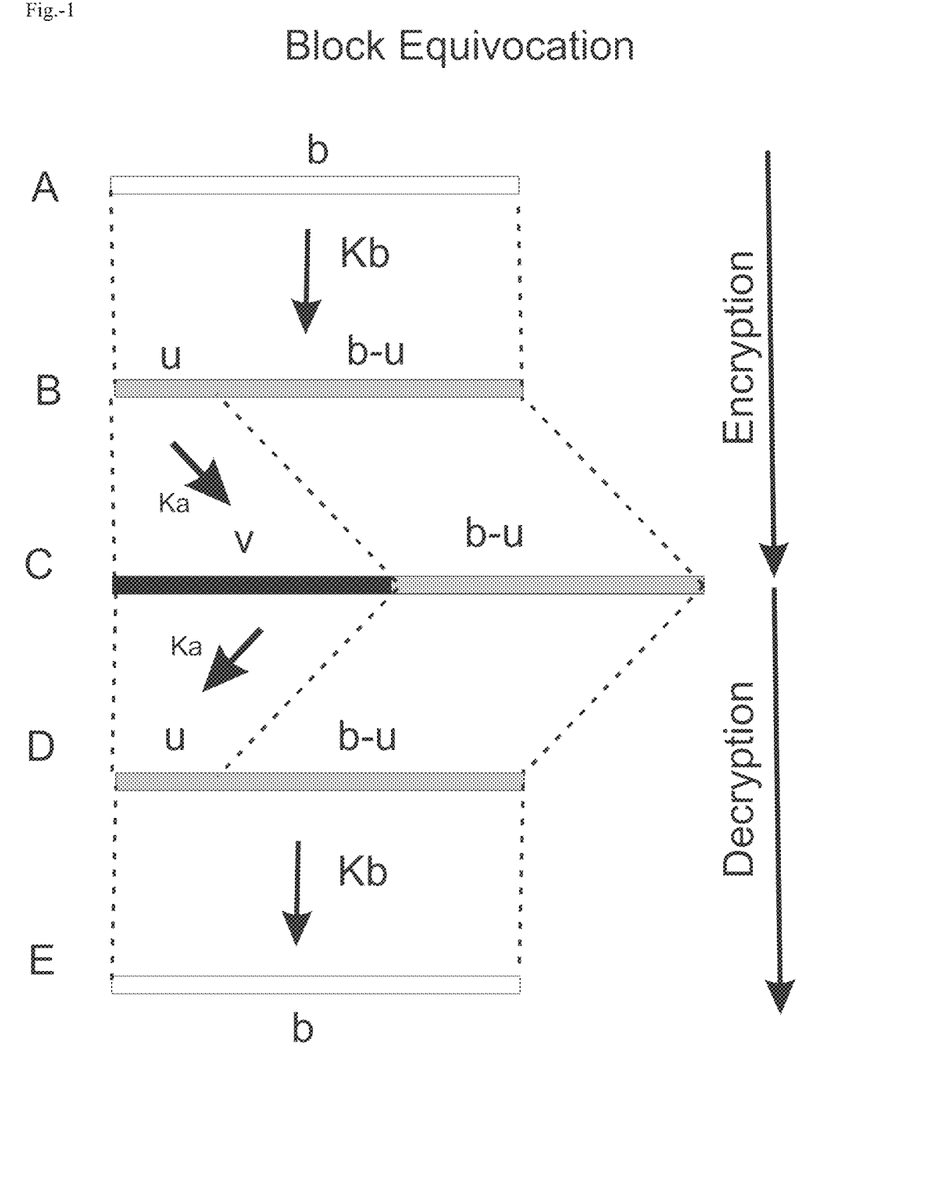
FIG. 1: Block Equivocation

The figures shows the plain block message at the upper part (level A), it shows its size: b bits. This is the standard block size used by the size-preserving encryption. The user than deploys the size-preserving cipher, the "base cipher" with the corresponding key, $K_b$, to generate the ciphertext block. The corresponding ciphertext block is shown at one level lower (level B) in the drawing, where the size of the ciphertext block is the same: b bits. The user then removes the leftmost u≤b bits from the ciphertext, and encrypts these u bits to a larger ciphertext string of size v>u bits. This may be the unary cipher that achieves high degree of security via large ciphertext (any equivalent cipher will do). The transmitter than concatenates the (b-u) bits remaining in the ciphertext block on the right of the v-bits size size-enlarging ciphertext, to generate a transmission ready ciphertext of size b−u+v bits, as shown on level C in the drawing. This concludes the encryption process. The b−u+v block is now transmitted to the intended recipient. The intended recipient will remove the v leftmost bits from the encrypted block they receive (of size b-u+v bits), and use the size-enlarging cipher to decrypt this v-size string to its corresponding shorter size plaintext (of size u). Next the intended reader concatenates the remaining b-u bits from the transmitted ciphertext to the decrypted part of size u bits (decrypted using $K_a$), and with this concatenation the reader constructs the b size block, which is the preliminary ciphertext block encrypted with the size-preserving cipher. The reader will decrypt this b-bits size block, using the shared $K_b$, and extract the original plain block.

Figure 2:
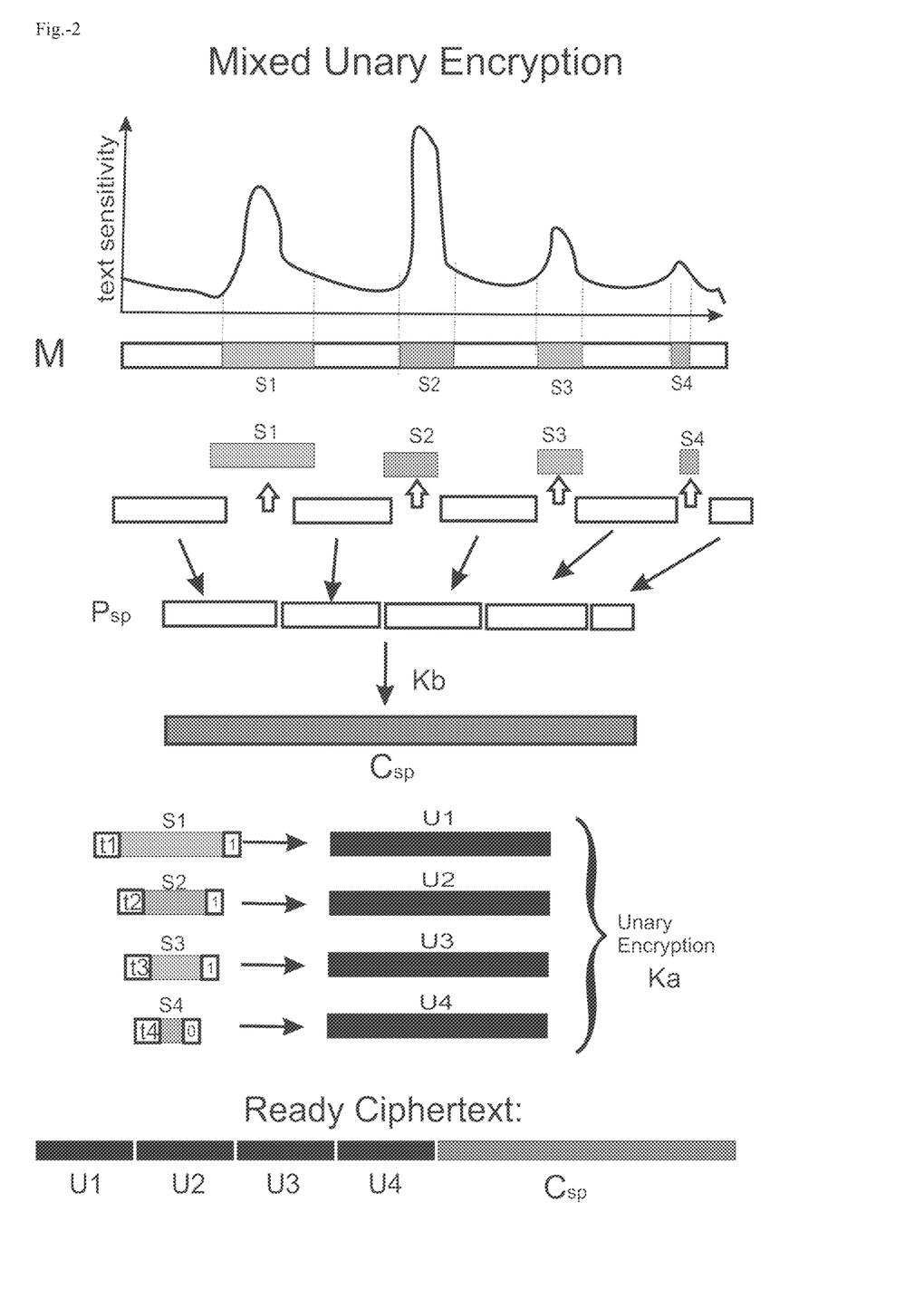
FIG. 2: Mixed Unary Encryption

The figure shows a message M intended for mixed unary transmission. The message is analyzed per sensitivity of its content. The 'text sensitivity' graph above the depiction of M shows sections of high sensitivity. These are names, numbers, or in general non-popular words, or phrases or paragraphs that contain the more telling part of the secret message M. (For example: let M="Our secret recipe calls for using garlic and ginger at 1:3 ratio". The high sensitivity parts are "garlic", "ginger" and "1:3"). The figures then show how the parts of M corresponding to high sensitivity text are marked. Four substrings are so marked S1, S2, S3, and S4. They are of different sizes and their bit locations in M are respectively t1, t2, t3, and t4. The transmitter will then remove the four high-sensitivity sections, as shown at the level below. This leaves the rest of M divided to five disjoint parts, as shown in the figure. The transmitter will then concatenate the disjoint parts of M and construct a single bit string, which is marked as $P_{sp}$ (the size-preserving plaintext). The concatenated string will then be encrypted with the base cipher, using $K_b$ to generate the corresponding ciphertext $C_{sp}$. The extracted four high-sensitivity sections S1, S2, S3 and S4 will be prepared for size-enlargement encryption by adding the bit position of each string, t1, t2, t3 and t4 respectively as headers, and adding a continuation signal bit as a trailer bit. For all the sections except the last, S4, the continuation signal is 1, for S4 it is zero as shown in the figure. All the found sections are encrypted using the size-enlargement cipher, A (using key $K_a$) to their corresponding ciphertexts U1, U2, U3 and U4 respectively, as shown. All the ciphertext blocks are of same size: $|U1|=|U2|=|U3|=|U4|=v$. The four U strings are concatenated by order to form a string of size 4v bits. This string is then concatenated with $C_{sp}$ to its right end, to form the transmission ready ciphertext. Its size is $(|M|-|S1|-|S2|-|S3|-|S4|)+4*v$ bits, as shown.

Figure 3:
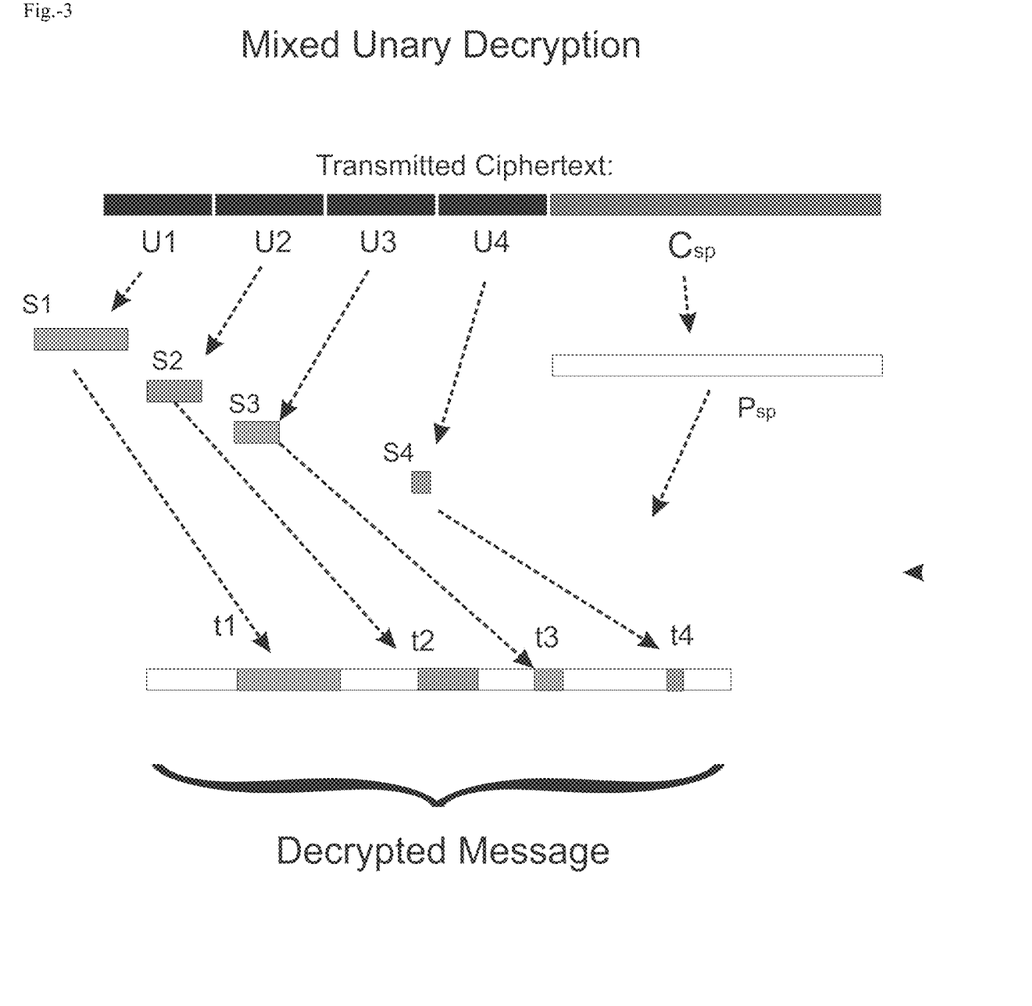
FIG. 3: Mixed Unary Decryption

This figure shows how the transmitted ciphertext is handled by the intended reader sharing the base cipher key $K_b$ and the text-augmentation (enlargement) key, $K_a$. The reader will first remove the v left most bits from the ciphertext package. This will be U1. Decrypting U1 with $K_a$ will yield S1 and t1 (the location of S1 in the plaintext). The continuation bit will be revealed as 1, indicating that there is another U block in the package, so the next leftmost v bits are being removed from the ciphertext package, and similarly processed. When the reader comes to S4, the continuation bit reads '0' indicating that the remaining string is the size-preserving part, namely $C_{sp}$. The reader will then decrypt it using the base cipher (key $K_b$), and generate $P_{sp}$ the corresponding plaintext, as shown. Into this plaintext the reader will then interject S1 at bit position t1, then S2 at bit position t2, S3 at bit position t3 and finally S4 at bit position t4. These interjections faithfully recreate the message M which was encrypted by the transmitter.

1.0 INTRODUCTION

Unary cipher cryptography builds a ciphertext that does not commit to its generating plaintext. The unary ciphertext $C_u$ points to n plaintexts $P_1, P_2, \ldots, P_n$ as possible generators, each with a fitting key. So key $K_i$ will encrypt $P_i$ to $C_u$. (i=1, 2, ... n). The intended reader, holding a particular key $K_j$ will convert $C_u$ to $P_j$, but an attacker examining $C_u$ will list the n plaintext candidates and will not find within $C_u$ any clue to $P_j$ as opposed to all the remaining (n−1) plaintexts. The price paid for this advantage is a rather large ciphertext. The ratio between the size of $C_u$ and $P_j$ is very high.

Proposing a means to mitigate the oversize burden by combining a size-preserving cryptography with the Unary option. This proposal will equally apply to any other high-security cipher generating a ciphertext larger than the generating plaintext.

Here is one option to achieve this mitigation: A plaintext P will be encrypted to a size-preserving ciphertext $C_{sp}$ where:

$|C_{sp}|/|P| \to 1$

One will then select a cut $C_c$ of $C_{sp}$ to be Unary encrypted:

$C_{uc} = \text{UNARYEnc}(C_c)$ where UNARYEnc is the operation of unary encryption, thereby creating a hybrid ciphertext $C_h$ combined of the size preserving ciphertext that has not been re-encrypted, but left in tact, $C_l$ plus the reencrypted $C_{uc}$:

$C_{mu} = C_l + C_{uc}$

In order to retrieve P one will first decrypt $C_{uc}$ to $C_c$, combine $C_c$ with $C_l$ to $C_{sp}$:

$C_{sp} = C_c + C_l$ and then decrypt $C_{sp}$ to P.

The attacker in possession of the mixed unary ciphertext $C_{mu}$ will not be able to distinguish which part of $C_{mu}$ is re-encrypted with the Unary cipher, and which is only encrypted once with the size-preserving cryptography.

This confusion will translate to confusion as to the size of P, and of course to the degree it was "unarized".

In order to function right the intended reader will need to be aware of (i) the key to the size preserving cipher, $K_{sp}$, (sometimes called the base key: $K_b = K_{sp}$) (ii) the key to the unary cryptography $K_u$, and (iii) to means to distinguish between the re-encrypted part $C_c$ and the left ciphertext $C_l$. Items (i) and (ii) are handled in the ordinary way. Item (iii) is unique.

1.1 Identifying the Unary Encrypted Portion of the Ciphertext

A strait forward way to do so is for the user to somehow decide on parceling out the size-preserving ciphertext $C_{sp}$ to an alternate series of untouched substrings $L_1, L_2, \ldots$ and Unary encrypted cut substrings $C_1, C_2, \ldots$, such that the mixed-unary ciphertext $C_{mu}$ will be written as:

$C_{mu} = L_1 \| C_1 \| L_2 \| C_2 \ldots$

To hide this parceling pattern the user will have to keep the percolation as part of the secret shared by the transmitter and recipient. Alternatively the user will share the ciphertext-division pattern, expose the degree of confusion added by the Mixed Unary cipher and rely on the inherent equivocation generated by the unary encryption add-on.

We distinguish here between two classes of size preserving encryption: (i) propagated encryption and (ii) block encryption.

Propagated Encryption

In propagated encryption errors in the beginning of a stream are propagated down stream. It is therefore of advantage to apply the unary re-encryption at the beginning of a stream. One would then define a block of a stream, B, and allocate the first bits in B to be re-encrypted. Generally one would make early section $C_1, C_2$, larger than later sections. Or say as a rule $|C_i|>|C_j|$ for i<j.

A preferred strategy will be to have all $C_i$ be of size zero except for $C_1$, also $L_1$ may be made zero. In that case the user will have to either pre agree or convey to the reader the value of $|C_1|$.

Block Encryption

In block encryption a fixed size block of plaintext, B, is encrypted with a key, K to a corresponding ciphertext C. Then the next block of same size is encrypted again using the same key, K.

The Mixed Unary strategy in this case might be to introduce equivocation to a portion $E_p$ of the block B, for each encrypted block, and to build the mixed unary ciphertext as:

$|C_{mu}| = |E_c| + (|P| - |E_p|)$ where $E_c$ is the result of unary encryption of $E_p$

Analysis

Obviously it is advantageous to hide from the attacker the identify of the unary-re-encrypted portions, but the security analysis of this Mixed Unary method we may want to carry out under the assumption that the attacker in some way was able to find out which portions of the unary mixed string are unarized (re-encrypted). The key security feature is in the fact that the ratio $|E_p|/|E_c|$ is unknown to the attacker. We advance the Unary cipher to a state where given $|E_c|$ we have $0 \leq |E_p| \leq (1/3)E_c$. And of course the identity of $E_p$ cannot be determined because it cannot be distinguished from the large number of $E_p$ candidates that could have been unary encrypted to $E_c$.

2.0 UNARIZED BLOCK CIPHERS

A block cipher is a size preserving cipher, where a plaintext block $B_i$, i=1, 2, . . . is encrypted to same size ciphertext $C_i$. In general the bits of the ciphertext are interlocked, namely flipping even one bit in $C_i$ will result in completely different plaintext, when decrypted with the same key. Accordingly if the block size is b=|P|=|C| then by creating a unary equivocation over e<b bits, the identity of the pre-unarized block which had no equivocation without the unarization will now sustain an equivocation Q(e), namely there are Q(e) possible blocks that qualify as the corresponding pre-unarized ciphertext block. This implies that even if the attacker knows the corresponding plaintext, it will have to exhaustively search through Q(e), to find the block encryption key, $K_b$.

The larger the value of e, the greater the equivocaion, but also the larger the size of the unarized ciphertext. So optimization is in order.

We describe two basic application modes for block ciphers:
 block obfuscation
 contents driven The idea of block obfuscation is to insure the size-preserving encrypted version of each block of plaintext will be obfuscated, not single valued. If the block cipher works on a block B of size b bits, then u<b bits of each block will be "unarized". As a result each of the size-preserving encrypted blocks will have Q(u) possible strings. By unarizing each block on the stream for a sufficiently large value of u, there would be no deterministic way for the attacker to crack the size-preserving encryption.

The idea of 'contents driven' is for the transmitter to mark extra sensitive portions in their transmitted message, and then unarizing only these portions.

2.1 Block Obfuscation

Let the size preserving encryption be comprised of blocks $B_1, B_2, \ldots$ each comprised of b bits. The users pre agree on increased level of security 1, 2, . . . s, and choose a bit number $e_1, e_2, \ldots e_s$ for these s grades of security where $e_i < e_{i+1}$ for i=1, 2, . . . (s-1) and where $e_s \leq b$.

Each of the s security levels will be associated with unary block sizes: $u_1, u_2, \ldots u_s$ such that $u_i \geq 3*e_i$, for i=1, 2, . . . s. This ratio of 3 is unique for the unary cipher (TEAM cipher), it may not apply to other oversize ciphertext ciphers.

The transmitter then will first apply the size-preserving block cipher over their message M and generate the corresponding ciphertext C comprised of the per block encrypted blocks; $C_1, C_2, \ldots C_w$.

The transmitter would decide on a security level among the s options, say security level j. Then each ciphertext block $C_i$ also of size b bits will be divided to the first $e_j$ bits and the left over (b–$e_j$) bits. The $e_j$ bits will be unarized to a fixed size unarized block $u_j$. The size-preserving block which was of size b bits in its format after the size preserving encryption, will now be of size $u_j$+b–$e_j$. If the security level j is kept for the full transmission, then the ratio between the original message M and the combined encrypted message N will be:

$$|N|/|M|=(u_j+b-e_j)/b$$

The ratio between the fully unarized message M to the mixed-unarized message M will be:

$$R=b(u_j/e_j)/(u_j+b-e_j)$$

Illustration: let the block size be b=256 bits, let $e_j$=25, and let $u_j$=200. Substituting these numbers in the above formula one computes a size increase |N|/|M|=1.68. with R=4.75. Instead of a 700% ciphertext increase using the same unarization ratio over the entire plaintext, the mixed unarization achieves a small 68% size increase.

The transmitter will send the $u_j$ bits for each block followed by the (b–$e_j$) bits of the non-unarized section of the ciphertext. This will conclude the bit transmission per block, and will repeat for every successive block.

The recipient will parcel the incoming mixed unary ciphertext such that it will cut off the next ($u_j$+b–$e_j$) bits from the stream, then decrypt through the reverse unarization the first $u_j$ bit to recreate $e_j$ bits from the size preserving original encryption, then concatenate to these $e_j$ bits the remaining (b–$e_j$) bits in the block, and thereby reconstruct $C_i$ for i=1, 2, . . . w (of each block). Once $C_i$ is reconstructed, it will be decrypted using the size preserving cipher in order to regenerate the plaintext version $P_i$ of this block. So it will be done block by block for i=1, 2, . . . until the full message M is recreated at the recipient side

Content Driven Unarization

In this mode the original plain message M is scanned by the transmitter to identify sensitive sections $S_1, S_2, \ldots S_t$ containing information of higher secrecy so that the extra protection of unarization is desired. Only these sections will be unarized while the rest of M will be encrypted via a size-preserving cipher. This will achieve a proper balance between ciphertext size and security.

Operation: the transmitter will mark the t sensitive sections on M. then the transmitter will note the bit positions of the sensitive sections $g_1, g_2, \ldots g_t$. Namely sensitive section $S_i$ starts after bit count $g_i$ on M.

Then the transmitter will remove these sections by order from M, and add to each section $S_i$ at either end, the value of the corresponding $g_i$. and continuation signal. The continuation signal, CS, will indicate whether this section is the last one, or not. These add-ons will create a "marked sensitive section" $S_i^*$:

$$S^*_i=[g_i][S_i][CS_i]$$

Each marked sensitive section $S^*_i$ for i=1, 2, . . . t will be unarized into a fixed size block $U_i$, of size u bits.

The leftover of M (namely M minus the extracted t sections $S_1, S_2, \ldots S_t$) will be encrypted via a size-preserving encryption and result in a ciphertext representing the leftover $C_l$ of size $|M|-\Sigma|S_i|$ for i=1, 2, . . . s bits.

The transmitter will now build the ciphertext to be transmitted to the recipient as follows:

[mixed unary ciphertext of $M$]=$C_{mu}$=$U_1\|U_2\|\ldots\|U_s\|C_l$

The total size of the transmission is $t*u+|M|-\Sigma|S_i|$ for $i=1, 2, \ldots t$ The ratio size between mixed unary ciphertext $C_{mu}$ and the original message is:

$R=(t*u+|M|-|S_i|)/|M|$

Illustration: Let M be of size $|M|=10,000$ bits. Let M contain 5 sections of 100 bits each of high sensitivity (t=5). Let u=1000. The size of the mixed unary ciphertext will be: 5*1000+9500=14,500 bits, namely a 45% size increase over size preserving encryption only, Had M been fully unarized at similar ratio, then the unarized cipher would have been of size 100,000=10,000*10, or almost 7 times larger;

The recipient of $C_{mu}$ will parcel the incoming ciphertext u bits at a time, will decrypt each u bits successively into $S*_1$, $S*_2, \ldots S*_t$ then read on each $S*_i$ for $i=1, 2, \ldots t$ the value of $g_i$ and the continuation signal. This will continue until the continuation signal will indicate that the final sensitive section was handled. This will indicate to the recipient that the remaining bits in $C_{mu}$ are encrypted with the size preserving encryption, and decrypt them accordingly. Once decrypted the recipient will put into the decrypted stream the decrypted sensitive sections $S_1, S_2, \ldots$ each at the right position $g_1, g_2, \ldots$ respectively and by order.

When done the original message M is recreated at the recipient end.

Content Selection Solutions

The mixed-Unary encryption in a content-driven mode requires a method to identify in a plain message stream the 'nuggets,' the parts that should be unarized. Options:
manual
word frequency
advanced AI Manual mode is based on the transmitter identifying parts deserving extra security, marking them so that the crypto software will identify them. A simple automatic way is based on a database of frequent words in the language, so that every word that is not on that database is marked for unarization. One can also employ today's advanced semantic AI and single out parts of extra sensitivity.

Any combination of these methods will also work.

One could develop a dedicated HTML tag like <marked text>, to communicate with the mixed unary software.

Unilateral Division of Unarization Content

In the content driven methodology the output block is of a known fixed size, of u bits, but the equivocated pre-unarization text comprises e bits where $0 \le e \le (⅓)e$. Note: as analyzed, the unarization process at the very least increases the size of the plaintext three folds into the size of the corresponding ciphertext. This equivocation over the size, not just the identity, of the unarized plaintext is a strong feature of the security of the cipher. In general the smaller the value of e, the greater the equivocation, especially against a persistent brute force approach integrating all the known instances of unarization.

It is therefore of great importance to allow the transmitter to unilaterally decide the values of e to be used in the unarization. This can be easily done, as follows:

Let a message M of size m bit be marked with sub sections marked for unarization $S_1, S_2, \ldots S_t$, of corresponding bit sizes $s_1, s_2, \ldots s_t$.

Let the transmitter desire to spread the unarization sessions over $w \ge t$ unarized blocks. To that end the transmitter will break one or more of the $S_i$ sessions to two or more parts such that the sum total of the t $S_i$ sections will equal the sum total of w break-up sessions $W_1, W_2, \ldots W_w$: Reviewed as concatenated:

$[S_1][S_2]\ldots[S_t]=[W_1][W_2]\ldots[W_w]$

The W sections will be regarded as the individual sections to be each unarized independently. Each of the W sections will be noted with its bit position in the plaintext message M, so that the recipient will know exactly where to fit it in when re-assembling the plaintext.

This transformation from the t S sections to the w W sections is done unilaterally by the transmitter, No need to pre coordinate it with the recipient. The ciphertext itself will be correctly interpreted by the recipient, based on the content-driven unarization procedure. The larger the value of w the greater the ratio between the fixed size unarized ciphertext block (u bits long), and the pre-unarization input which is $w_i$ bits long for $i=1, 2, \ldots w$. And the greater this ratio, the greater the equivocation, and the greater the equivocation, the greater the security. Also the larger the increase of w over t, the larger the mixed-unary ciphertext.

Illustration: Let M be of size $m=|M|=10000$ bits. Let one mark 3 sections for unarization as follows:
$S_1$, at bit 450 and of length $s_1=200$ bits
$S_2$, at bit 2000 and of length $s_1=1000$ bits
$S_3$, at bit 8100 and of length $s_1=50$ bits The selected size of the unarized block is u=2000 bits.

It turns out that $S_2$ is too large for fitting into a single unarbloized block because the maximum size is 2000/3=666 bits. The transmitter then decides to cut $S_2$ to five parts, and thereby create a W series as follows:
1. $W_1=S_1$ positioned at bit $g_1=450$
2. $W_2$=First 250 bits from $S_2$ positioned at bit $g_2=2000$
3. $W_3$=2nd 250 bits from $S_2$ positioned at bit $g_3=2250$
4. $W_4$=3rd 250 bits from $S_2$ positioned at bit $g_4=2500$
5. $W_5$=next 150 bits from $S_2$ positioned at bit $g_5=2750$
6. $W_6$=next 100 bits from $S_2$ positioned at bit $g_6=2900$
7. $W_7=S_3$ at bit position $g_7=8100$ The transmitter will extract the 7 W sections from M and then:

form 7 encryption ready strings $W_i*$ for $i=1, 2, \ldots 7$ $W*_1=[450][W_1][CS=1]$ $W*_2=[2000][W_2][CS=1]$ $W*_3=[2250][W_3][CS=1]$ $W*_4=[2500][W_4][CS=1]$ $W*_5=[2750][W_5][CS=1]$ $W*_6=[2900][W_6][CS=1]$ $W*_7=[8100][W_7][CS=0]$ CS (continuation signal) is zero for all the W* strings except for the last one where CS=1 so the recipient will know that block 7 is the last.

The transmitter will then unarize each of the 7 W* blocks to 7 unarized blocks, $W*_i \rightarrow U_i$ For i=1 to i=7

The transmitter having extracted the W (or S series, which is the same) from the plaintext message M, will then form the left-over message stream $L_p$:

$L_p=M-\Sigma S_i \ldots$ for $i=1,2,3=M-\Sigma W_i$ for $i=1,2, \ldots 7$

The transmitter will then use the size preserving encryption over $L_p$ and encrypt it into $L_c = C_{sp}$.

Next the transmitter will form the ready-for-transmission mixed-unarized ciphertext, $C_{mu}$:

$$C_{mu} = U_1 \| U_2 \| \ldots \| U_7 \| C_{sp}$$

$C_{mu}$ is transmitted to the intended recipient. The intended recipient knows that there is at least one unarized block of size u in the stream, so they clip the first u bits from $C_{mu}$ ($U_1$) and reverse-unarize this block to recover $W^*_1$ where they see that the continuation signal is 1, meaning, there is another block in the $C_{mu}$ stream, so the recipient reverse-unarizes the next u bits ($U_2$) in the ciphertext, and so recovers $W^*_2$, where they read that there is another unarized block. They do so for the 7 blocks, clipping all together 7u bits from $C_{mu}$ and in $W^*_7$ they read CS=0, namely block 7 is the last unarized block. The recipient then regards the leftover ciphertext, $L_c$, (the original $C_{mu}$ minus the first 7u bits) as having been the result of the size-preserving encryption, and then the recipient decrypts $L_c \rightarrow L_p$ (the part of M that is missing the S sections—or the W sections which is the same).

Next the recipient strips away the header ($g_i$) and the continuation bit to recover $W_i$ from $W^*_i$. Then the recipient needs to fit the 7 strings $W_1, W_2, \ldots W_7$ into the decrypted base plaintext $L_p$. This has to be done by order. First the recipient fits $W_1$ after bit 450 in $L_p$. Then the recipient fits $W_2$ after bit 2000 in ($L_p + W_i$), and so on, by order, all the 7 blocks are fit into the built up M, and when the 7 blocks are fit in, then $L_p$ is built up to the original M and the transmission is completed.

Unarized Propagated Encryption

When the size preserving cipher is such that errors propagate then preferably all the unarizaion may be done at the beginning of the plaintext stream. The entire message M will be encrypted into the size-preserving ciphertext, $C_{sp}$, using size preserving cipher, then the first e bits thereto (assigned as the pre-unarized plaintext, $P_u$) will be unarized into the corresponding unarized ciphertext U of a predetermined size: $|U|=u>e$ bits. If the unarized cipher is being used then $u \geq 3e$. If another ciphertext-enlarging cipher is used for this procedure then the ratio between u and e may be different. The value of u will be communicated to the intended recipient. The leftover part of $C_{sp}$, $C_l$, of size ($|M|-e=|C_{sp}|-e$) bits will be concatenated on the right of the unarized ciphertext U, to form the transmission-ready mixed unary ciphertext, $C_{mu} = U \| C_l$, of size $u + (|M|-e)$ bits.

The recipient will receive the mixed ciphertext $C_{mu}$, remove the leftmost u bits (U), and use the shared unary key, $K_a$, to decrypt U to $P_u$. The leftover part of $C_{mu}$ is $C_l$. The recipient will then rebuild $C_{sp}$ by concatenating $C_l$ onto $P_u$: $C_{sp} = P_u \| C_l$. The recipient will use the shared size-preserving key, $K_b$, to decrypt $C_{sp}$ to M.

Flexible Unarization

The procedures described herein for mixed-unary cryptography depend on flexibility to shape the unarization to allow a user to increase the size of the unarized ciphertext to the desired size of the generated ciphertext.

Three simple ways to do so are: (i) shadow add ons, and (ii) left-add on, and (iii) right add-ons.

The original pre-unarized bit stream M is randomly divided to sections $P_1, P_2, \ldots P_h$. Each section has a binary value $v_i$ and is written with $r_i$ leading zeros. i=1, 2, ... h.

Each $P_i$ will be represented by two bit strings $V_i$ and $R_i$. $V_i$ is comprised of $v_i + 1$ bits and $R_i$ is comprised of $r_i + 1$ bits. The ciphertext may be constructed either as form α:

$$\alpha: V_1 \| R_1 \| V_2 \| R_2 \| \ldots \| V_h \| R_h \|$$

or as form β:

$$\beta: V_1 \| V_2 \| \ldots \| V_h \| R_1 \| R_2 \| \ldots \| R_h \|,$$

To use the α form one will express all the V strings as either all "1" or all "0", and represent the R strings with the opposite identity. Thereby α reader of a will know how to break it up to its constituent strings. If $V_i$ is all zeros then $R_i$ is all ones, and $V_{i+1}$ all zeros and $R_{i-1}$ are all ones, and so on.

To use the β form one will alternate the identities of the V bits, so that if $V_1$ is comprised of $v_1 + 1$ zeros, then $V_2$ will be comprised of $v_2 + 1$ bits of identity 1, and $V_3$ is comprised of $v_3 + 1$ bits of identity 0, and so on. If h is even then $R_1$ will be comprised of $r_1 + 1$ zeros and $R_2$ will be comprised of $r_2 + 1$ "1". And so on. If h is odd then $R_1$ will be comprised of $r_1 + 1$ "1", and $R_2$ will be comprised of $r_2 + 1$ zeros, and so on. This will allow the p string reader to break it up to the V and R constituents. Note that weather h is even or odd, the total number of strings is even, so it is clear how to break the combined string to two parts: the h V strings followed by the h R strings. The individual strings are identified through the alternating bit identities from one string to the next.

We define shadow strings $Q_j$ for j=1, 2, ... as strings for which V string $V_j$ is comprised of one bit: $|V_j(Q_j)|=1$, and also the corresponding R string $R_j$ is comprised of one bit: $|R_j(Q_j)|=1$. When a shadow will be evaluated to its original representation it will evaluate to a string of value 0 having 0 leading zeros, which is a vanishing string. Therefore one could add a shadow between any two P sections before unarizing it. It will show up in the encrypted version of the string, but the shadow will vanish in the decrypted version. It is therefore a simple way to add bits to the unarized ciphertext string without affecting the original plaintext message:

$$\| P_i \| P_{i+1} \| \rightarrow \| P_i \| Q_j \| P_{i+1} \| \rightarrow \text{Unarized}(\| P_i \| Q_j \| P_{i+1} \|) \rightarrow \text{de-unarized}(\| P_i \| Q_j \| P_{i+1} \|) \rightarrow \| P_i \| P_{i+1} \|$$

One can implant any number of shadows, for example:

$$P_1 \| P_2 \| Q_1 \| P_3 \| Q_2 \| Q_3 \| P_3 \| P_4 \ldots$$

As this example shows shadows can be put next to each other. And thereby they increase the size of the unarized ciphertext to any desired size. That is how even small plaintext, or empty plaintext can generate any size unarized block. One could build a plaintext message M as all shadows: $Q_1 \| Q_2 \| \ldots \| Q_h$ Illustration: Let M=010001011. We divide it to three P sections as follows: $P_1$=0100, $P_2$=010, $P_3$=11. Accordingly $v_1$=4, $r_1$=1, $v_2$=2 $r_2$=1, $v_3$=3, $r_3$=0. Using the p method we construct $M_u$ as: 00000111000011001. We may add a shadow between P2 and P3: Accordingly $v_1$=4, $r_1$=1, $v_2$=2 $r_2$=1, $v_3$=0, $r_3$=0 $v_4$=3, $r_4$=0. and we write:

$M_u$=0000011101111001101

M will then be transposed to the corresponding ciphertext. The ciphertext will be reverse transposed by the intended recipient to extract $M_u$. from where M will be rebuilt as follows. It is clear that Mu is comprised of 8 strings. Since the reader knows that the beta form was used the reader will extract the $v_i$ and $r_i$ values, identify the shadow, and reconstruct M.

The right and left add-on procedures work as follows:

A right add on will add on the right of a unarized (pre-encrypted) string, either α or β, either the sequence 100 . . . 01, or the bit sequence 011 . . . 10. In the first case the reader will see $\alpha_r = \alpha \| 100 \ldots 01$ or $\beta_r = \beta \| 100 \ldots 01 \|$ The reader will readily strip down the right add on by stripping the rightmost 1, then stripping all the zeros up to the first bit of identity 1, then strip that bit too, thereby successfully stripping the right add on.

It works similarity for the sequence 011 . . . 10. The reader will strip the first zero, then all the bits of identity one, until a bit of identity zero is encountered, and it will be removed too. Thereby the add-on can be clearly removed.

This works very similarly with left-add on. The same type of strings can be added in front of either α or β strings. One could thereby add zeros on the left side of α or β and add bits with identity 1 on the right side of a or beta (or the other way around, stuff "1"s on the left side and "0"s on the right side).

$$\alpha_{r-1} = 100 \ldots 01 \| \alpha \| 011 \ldots 10$$

and $$\beta_{r-1} = 100 \ldots 01 \| \beta \| 011 \ldots 10$$

Together these methods will increase the size of the unary represented plaintext M. The unarized pre-encrypted representation of M as described herein will be transposed with the transposition key to the transposed (encrypted) version of the unarized version of M.

Procedures

Mixed Unary Cryptography may operate in (i) fixed format mode, or (ii) in contents-sensitive mode. In both modes the parties to the operation share a size-preserving key, $K_{sp}$ for the size-preserving cryptography and a unary key, $K_u$ for the unary cryptography. For contents-sensitive mode, the parties will also share the 'unary block size', B, preferably as a secret.

Contents-Driven Mode

In Contents Driven mode (CDM) the transmitter enjoys great latitude in deciding the level of security used for the transmission. There are a host of security related decisions taken by the transmitter without having to pre-coordinate with the recipient. Thus the transmitter will allow the contents of the transmitted message to guide them.

The CDM procedure will have the following symmetrical parts: the first parts carried out by the transmitter and the latter parts are carried out by the recipient.

1. Message Disassembly 2. Encryption 3. Cipher Assembly 4. Transmission 5. Reception 6. Cipher Disassembly 7. Decryption 8. Message Assembly Prior to these procedures the parties will agree on an encrypted message C identification. One envisions a message flow F going from the transmitter to the recipient. This flow is to be parceled out to a succession of messages M, M', M" which should be converted to the mixed-unary encrypted messages: C, C', C", . . . The parties will agree either on a fixed size of encrypted message or on means to mark a ciphermessage start and a ciphermessage end. The latter can be done by a header containing a header identification bit string followed by an agreed upon number of bits that identifies the bit length of the encrypted message ahead. Other means are also possible. When done the transmitter and the recipient will have an agreement as to the bit length of the next ciphertext message, C.

Transmission Procedure

The Mixed-Unary Transmitter will do the following:
1. Message Disassembly 2. Encryption 3. Cipher Assembly 4. Transmission Message Disassembly Given a message flow F, the transmitter will parcel it to messages M, M', M" to be processed in succession and delivered to the recipient one after the other. The size of M will have to be small enough so that its encrypted version can fit to the agreed upon size of corresponding ciphermessage, or the parties will use dynamic size identification where the header of the ciphermessage will identify its size.

So doing, the transmitter will come to identify a message M now to be processed by the Mixed Unary Procedure. M is then to be disassembled to n ordered unary messages: $u_1$, $u_2$, . . . $u_n$ and the leftover single base message. $M_l$. The unary messages are not overlapping. They are removed one by one from M, and the 'cut out' M is recombined to a continues message defined as the left over message $M_l$.

Before removing any unary message from M, the recipient notices the bit position of each of the n unary message: $p_1, p_2, \ldots p_n$.

The identification of the n unary messages is done according to any of the various methods described ahead.

Illustration: A message flow F has been cut off. The first m=26 characters have formed a message M:

$M = ABCDEFGHIJKLMNOPQRSTUVWXYZ$

Three unary message have been identified in M: $U_1$=EFG, noted to be placed in position $p_1$=5, $U_2$=QRSTU noted to be placed in position 17, $p_2$=17, and $U_3$=X, noted to be placed in position $p_3$=24. Note: the illustration is using Base64 characters instead of bits. It works either way, it is simply easier to explain with character rather than with bits.

$M = ABCDEFGHIJKLMNOPQRSTUVWXYZ$

These unary messages are pulled out from M:

$M = ABCDHIJKLMNOPVWYZ$

The left over message is 'closing ranks':

$M_l = ABCDHIJKLMNOPVWYZ$

Thereby the original message M has been disassembled to its unary components and the left-over message.

Encryption

Two ciphers are being used: (1) the base, size-preserving cipher, and (2) the unary cipher. The size-preserving base cipher operates with a secret key $K_{sp}$, and the unary cipher operated with a unary key, $K_u$.

Each unary message $U_i$ is then prepared for unary encryption as follows:
1. Add position data as a header.
2. Add continuation-signal as a trailer This will convert $U_i$ to $V_i$:

$$V_i = p_i \| U_i \| [\text{continuation-signal}]$$

The header and the trailer may be expressed in a pre defined number of bits h, and t respectively. Thus the encryption prepared message $V_i$ will be of bit length:

$$|V_i| = h + |U_i| + t$$

For i=1, 2, . . . n $V_i$ is then encrypted to its corresponding ciphertext $W_i$, i=1, 2, . . . n. The sizes (bit count) of each $W_i$ is the same: $|W_i| = |W_j|$ for i,j=1, 2, . . . n which may or may not be secret. Note that there are several ways to encrypt various sizes of plaintexts to the same larger size ciphertext, as elaborated herein, Since this ciphertext-enlarging cipher increases the size of the ciphertext in reference to the generating plaintext, we have $|W_i|/|V_i| > 3$ for i=1, 2, n (or a different ratio for different ciphertext enlarging ciphers).

The leftover message $M_l$ is also encrypted using $K_{sp}$ to $C_l$ $$C_l = E_{sp}(M_l, K_{sp})$$

where $E_{sp}$ is the size preserving encryption algorithm.

Cipher Assembly

The encrypted unary messages $W_1, W_2, \ldots W_n$ are assembled in order.

We recall that every encrypted unary message, $W_i$, is of the same block size, $|W_i|=b$. Since there are n unary messages then the built bit string of the succession of unary messages will be bn bits long.

The marked unary ciphermessages are concatenated in order to form the Unary portion of the assembled ciphertext:

$$C_u = W_1 \| W_2 \| \ldots W_n$$

Next the leftover ciphertext $C_l$ is concatenated to the unary portion to assemble the transmission-ready ciphertext:

$$C_{mu} = C_u \| C_l$$

Transmission

The assembled mixed-unary ciphertext is submitted as a package with proper signaling for start and finish. A time delay may be effected between one message M from the flow F and the next message M' from the flow, and in between a reception signal sent from the recipient.

The protocol may specify an acknowledgment of the recipient of the number of bits received, or one may use a digital signature, or any of the common ways for transmitter and recipient to insure that what was transmitted is exactly what was received.

Reception Procedure

The reception steps are:

5. Reception 6. Cipher Disassembly, Decryption, Re-Assembly

Reception

The recipient will execute any nominal protocols to insure that the assembled ciphertext $C_{mu}$ has been delivered in full and without errors.

Cipher Dis-Assembly and Decryption

Disassembly of $C_{mu}$ will proceed as follows:

1. Split the leftmost b bits from $C_{mu}$. This will cut off from $C_{mu}$ the i=1 unary encrypted message $W_i$. 2. Use the shared unary key, $K_u$ to decrypt $W_i$:

$$V_i = D_u(W_i, K_u)$$

where $D_u$ is the decryption algorithm for the unary cipher.

3. Inspecting $V_i$, the recipient will (i) regard the first (leftmost) h bits as the header information, to be interpreted as the position of unary message i in the original message M, $p_i$, and then (ii) will regard the t last, (rightmost), bits in $V_i$ as the continuation signal for unary message i, to find out whether $V_i$ is the last unary encrypted message, or not. The h header bits and the t trailer bits will be removed from $V_i$, leaving out the plainmessage $U_i$.

If the continuation signal indicates that the current unary message is the last, then the remaining bits in the left-truncated $C_{mu}$ will be regarded as the base ciphertext, or say the size-preserving ciphertext $C_{sp}$.

If the continuation signal is not the last, then the recipient increments the value of i: i→i+1, and repeats steps 1 to 3 above.

At the end of this process the recipient ends up with the n unary messages decrypted: $U_1, U_2, \ldots U_n$, and the encrypted base message $C_{sp}$.

Next the recipient uses the shared size-preserving key $K_{sp}$ to decrypt $C_{sp}$ and extract its corresponding plaintext:

$$M_l = D_{sp}(C_l, K_{sp})$$

where $D_{sp}$ is the decryption algorithm for the size-preserving cipher.

The next step is to fit the n plain unary message $U_1, U_2, \ldots U_n$ into the plain leftover message $M_l$. This will be done as follows:

For i=1 interject $U_i$ into the so reconstructed M at position $p_i$. Namely the reconstructed message $M_r$ for r=1, 2, ... n (which for r=1 we have $M_r = M_l$). The reconstructed message $M_r$ will be comprised of the first (leftmost) $(p_r - 1)$ bits, then the bits of message $U_r$, of count $|U_r|$ bits, followed by the remaining bits of the pre-injected reconstructed message $M_r$.

$$M_{r+1} = [(p_r - 1) \text{ leftmost bits of } M_r] \| U_r \| [(|M_r| - p_r + 1) \text{ rightmost bits of } M_r]$$

$M_{r+1}$ is the next step of reconstructing the previous level $M_r$ with the injection of the current $U_r$ message.

The unary messages will be fitted in order by incrementing r→r+1 and repeating the above until r=n. When all the n U messages are fitted into Ml, the resulting string is the original plaintext message which the transmitter intended to pass to the intended recipient.

Note: because this procedure is applied with adherence to the order of the unary messages in M, then each unary message $U_i$ will fit into the right position in the reconstructed $M_r$.

When done the reconstructed $M_r$ represents the original message M. The recipient is now in possession of the original message sent from the transmitter.

Illustration

Recalling the former illustration played out with letters. These letters can be regarded as Base64 characters, or mark bits. A message flow F has been cut off. The first m=26 characters have formed a message M:

$$M = ABCDEFGHIJKLMNOPQRSTUVWXYZ$$

Three unary message have been identified in M: $U_1$=EFG, noted to be placed in position $p_1$=5, $U_2$=QRSTU noted to be placed in position 17, $p_2$=17, and $U_3$=X, noted to be placed in position $p_3$=24.

$$M = ABCDEFGHIJKLMNOPQRSTUVWXYZ$$

These unary messages are pulled out from M:

$$M_l = ABCD< \ldots >HIJKLMNOP< \ldots >VW< \ldots >YZ$$

The leftover message is 'closing ranks:

$$M_l = ABCDHIJKLMNOPVWYZ$$

The unary messages are prepared for unary encryption but adding the header $(p_i)$ and trailer (continuation signal):

$$V_1 = 005 \| EFG \| 1$$

$$V_2 = 017 \| QRSTU \| 1$$

$$V_3' = 024 \| X \| 0$$

The unary messages are encrypted to fixed size block, B where $|B|=40$ $$W_1 = lbnbsjcqudtmudtrpnlmopschqeogbaekakbbhgx$$

$$W_2 = beuntemcpgtsoqqbjrjbduphagnksfvhkdrvavob$$

$$W_3 = cuobnesnlmrdmatraeqlocjkbpbrjskqbcphuhgg$$

$M_l$=ABCDHIJKLMNOPVWYZ is now encrypted with the size-preserving cipher into $C_l$=HMWCLYTPDVKBAJOZN.

The mixed-unary ciphertext is now being assembled:

$C_{mu}=W_1\|W_2\|W_3\|C_l$=lbnbsjcqudtmudtrpnlmopschqeogbaekakb
bhgxbeuntempcpgtsoqqbjrjbduphagnksfvh kdr-
vavobcuobnesnlmrdmatra-
eqlocjkbpbrjskqcphhggHMWCLYIPDVKBA-
JOZN.

$C_{mu}$ is transmitted to the intended recipient. The recipient is aware that the ciphertext contains at least one unary encrypted block of size 40 bits. They will therefore chop off 40 bits from the left side, and regard it as $W_1$=lbnbsjcqudtmudtrpnlmopschgeogbaekakbbhgx.

Applying the Unary cipher, the recipient will decrypt $W_1$ to $V_1$=005‖EFG‖1. The continuation bit valued 1 will indicate to the recipient that the ciphertext contains another unary encrypted block of size 40 bits. He will then chop off (from the left) the next 40 bits and regard them as $W_2$=beuntemcpgtsoqqbjrjbduphagnksfvhkdrvavob. Applying the Unary Cipher, the recipient will decrypt $W_2$ to $V_2$=017‖QRSTU‖1. The reader will spot the continuation bit as '1' and because of that will chop another string of 40 bits from the left of the leftover ciphertext, and thereby remove $W_3$=cuobnesnlmrdmatraeglocjkbpbrjskqbcphuhgg, which will be decrypted to $V_3$=024 ‖X‖0. The reader will identify the continuation bit as zero and realize that the remaining bits in the ciphertext message are the size-preserving encryption of the leftover message. The reader will decrypt as follows:

$C_l \rightarrow M_l$=HMWCLYIPDVKBAJOZN→ABCDHIJKLMNOPVWYZ

The reader will strip the headers and the trailers from the V strings to extract the corresponding U strings: $V_i \rightarrow U_i$. Now it is time to implant $U_1$, $U_2$, $U_3$ in $M_l$. Starting with $U_l$ that will fit into $p_1$=005 as indicated on $V_1$. $M_l$ will now grow to be:

ABCD*EFG*HIJKLMNOPVWYZ

The reader will do the same with U2 and place it at bit $p_2$=17:

ABCD*EFG*HIJKLMNOP*QRSTU*VWYZ

Note that because $U_1$ was implanted before $U_2$, then the count of $p_2$ will be accurate. Repeating with $U_3$:

M=ABCD*EFG*HIJKLMNOP*QRSTU*VW*X*YZ

Thereby the recipient reconstructed the original message sent to him by the transmitter.

Unary Messages Selection

Given a message M, one faces the task of identifying in M sub sections which will qualify as unary messages to be encrypted with the high-security offered by the unary cipher.

Identifying several selection modes:

1. Manual 2. Vocabulary 3. Artificial Intelligence

The writer can manually mark sections of their transmission as unary-qualified. Words that are not listed in a reference list of 'the most common words in the applicable language' are marked for unary concealment, or AI is unleashed to evaluate impact of various degrees of message exposure.

Generally these methods can be superimposed, with AI used after the two other modes.

The cipher can handle a variety of word size messages as well as large size unary messages (that can always be broken down to smaller parts).

Illustration: A transmitter plans the following transmission:

Next Saturday Jim will knock on Mary's door at 5 pm, pretending to need her help for jump starting his car. Mary will surely come out, and leave the house empty. Alice and Bob will then sneak in and decorate Mary's living room with birthday balloons and a big tray of sweets and presents to surprise Mary when she returns home.

The transmitter might use HTML tags to mark the transmission as follows:

<crypto grade=base>Next Saturday Jim will knock on Mary's door at 5 pm, <crypto grade=unary>pretending to need her help for jump starting his car.</crypto>Mary will surely come out, and leave the house empty. <crypto grade=unary>Alice and Bob will then sneak in and decorate Mary's living room with birthday balloons and a big tray of sweets and presents to surprise Mary </crypto>when she returns home.</crypto>

If Mary cracks the base (size preserving) cipher she will see:

Next Saturday Jim will knock on Mary's door at 5 pm, XXXX Mary will surely come out, and leave the house empty. XXXXX when she returns home.

Instead the transmitter could use the vocabulary method and unary encrypt all names, all time designations, and all uncommon words:

Next XXXX XXX will XXX on XXXX door at XXXX, XXXXX to need her help for XXXXX his car. XXXX will XXXX come out, and XXXX the house XXXX. XXX and XXXX will then XXXX in and XXXX XXXX XXXX XXXX with XXX XXXXX and a big XXXX of XXXX and XXXX to XXXX XXXX when she returns home.

AI version might look like:

Next Saturday Jim XXXX . . . XXXXX come out, and leave the house empty. XXXX . . . XXXX Mary's XXX XX . . . XXXXX when she returns home.

Creating a misleading impression. The XXXX notation represents words designated for unary encryption.

Summary of Operations

We identify two classes of Mixed Unary operation: (i) content driven, and (ii) block equivocation.

Content Driven Operation

The Mixed Unary operation in the content-driven mode is a method to combine two ciphers A and B to encrypt a plaintext to a corresponding ciphertext where selected parts of the plaintext will be encrypted with cipher A which offers augmented security through generating a ciphertext larger than the corresponding plaintext, and where the remaining parts of the plaintext will be encrypted with a "base" cipher B, which is generating a ciphertext of similar size to the corresponding plaintext, such that the user achieves a desired balance between the security of the augmented ciphertext and the burden of its augmented size, where the transmitter and the intended recipient of the encrypted message will both share the base cipher key, $K_b$, and the augmented cipher key, $K_a$, and where the transmitter will mark on the transmitted plain message M, n sections designated to be encrypted with cipher A: $P_1, P_2, \ldots P_n$, and where the transmitter notices the bit position $t_i$ on M of each selected plaintext message $P_i$ for i=1, 2, . . . n and where the transmitter prepares each section i of the n sections for encryption by adding from the left h bits used to indicate the value of $t_i$, and adding one trailer bit to the right of section $P_i$ such that for i=1, 2, ... (n−1), the value of trailer bit will be 1, and for i=n the value of the trailer bit will be zero:

$P^*_i$=[h bits indicating $t_i$]‖$P_i$‖[trailer bit]

then the transmitter will encrypt each of these sections using the augmented-ciphertext cipher A to their corresponding ciphertext sections $C_1, C_2, \ldots C_n$, $C_i=\alpha(P^*_i, K_a)$ where α represents encryption with cipher A, and where the size of these n ciphertexts is the same c=|$C_i$| for i=1, 2, ... n, and where the transmitter will remove the selected n sections from M and concatenate the left over separated sections of M to a contiguous left-over message $M_l$, and where the transmitter will encrypt $M_l$ with the base cipher B using key $K_b$:

$C_l=\beta(M_l, K_b)$ where β is the encryption function with cipher B, and where the transmitter will prepare the mixed ciphertext, $C_m$ by concatenating in order the n ciphertexts $C_i$ for i=1, 2, ... n, and then concatenating $C_l$:

$C_m=C_1‖C_2‖ \ldots ‖C_n‖C_l$ next the transmitter transmits $C_m$ to the intended recipient; the intended recipient will remove the c leftmost bits from $C_m$, namely $C_i$ for i=1, then decrypt it to the corresponding $P^*_i$ using $K_a$:

$P^*_i=\alpha^{-1}(C_i, K_a)$ ... for i=1,2, ... n where $\alpha^{-1}$ is the decryption operation of cipher A; then the recipient will decompose $P^*_i$ to the leftmost h bits indicating $t_i$, $P_i$, and the trailer bit; if the trailer bit is 1, then the recipient increments i→i+1 and repeats the extraction of c bits from what is left from $C_m$; for i=n the trailer bit is found to be zero, indicating to the recipient that all the n sections were removed from $C_m$ and the leftover from $C_m$, is $C_l$, which then the recipients decrypts using $K_b$ $M_l=\beta_{-1}(C_b, K_b)$ where $\beta^{-1}$ is the decryption function for cipher B; then the recipients interjects $P_i$ for i=1 into $M_l$ at position $t_i$, then increments i→(i+1), and interjects the next section in its indicated position, and so on for all the n sections, after interjecting the n sections in their indicated positions $t_i$, the left-over plaintext $M_l$ is being rebuilt to M, readable by the recipient.

The above method may be implemented in a case wherein the transmitter encrypts any selected section $P^*_i$ (up to a given limit) for i=1, 2, ... n to its corresponding ciphertext string $C_i$ of a given size c bits, by:

(i) adding a second header to $P^*_i$ in the form 100 ... 1 with one or arbitrary more '0' between the '1's, such that the reader will know how to remove this second header regardless of how long it is, and by (ii) adding a second trailer to $P^*_i$ in the form 0111 ... 0 with one or arbitrary more '1' between the '0's such that the reader will know how to remove this second trailer regardless of how long it is, using these second header and second trailer to insure that the bit size of the corresponding cipher string $C_i$ will be c bits. This is readily done with the unary cipher where the ciphertext is a permutation of the plaintext. Therefore by adding bits to $P^*_i$ so that |$P^*_i$|=c, one insures that $C_i$ will be of the desired size |$C_i$|=c.

Further specification is presented where the A cipher is operated on every plaintext $P=P_i$ for i=1, 2, n, as follows:

(i) P is randomly parceled to q concatenated sections, where q is even:

$P=Q_1‖Q_2‖ \ldots Q_q$ and where (ii) each $Q_j$ for j=1, 2, ... q is identified per its numeric value $v_j$ and per the number of leading zeros thereto, $r_j$, and where one constructs a string R by concatenating 2q strings, where the first q strings are comprised of ($v_j$+1) bit for j=1, 2, ... q, and where the identities of the bits in each string are the same and opposite of the identities of the bits in the adjacent strings, and where the second q strings are comprised of ($r_j$+1) bit for j=1, 2, ... q, and where the identities of the bits in each string are the same and opposite of the identities of the bits in the adjacent strings and where P is encrypted by using $K_a$ to transpose P to C, and where one generates P from C by the reverse transposition of P to C; and where one identifies on P the pair of strings of $v_j$+1 bits, and ($r_j$+1) bits for j=1, 2, ... q, and from these strings one reconstructs $Q_j$ for j=1, 2, ... q, and then one concatenates $Q_j$ to reconstruct $P=P_i$ for i=1, 2, ... n.

Further refinement option can be taken where one adds s 'shadow strings' $S_1$, S&inde2, .... $S_s$ to R, where each shadow strings is comprised $v_k$+1=1 bits and $r_k$+1=1 bits for k=1, 2, ... s; these shadow strings may be added between or before any of the $Q_j$ strings in P.

Block Equivocation

In block equivocation mode is essentially a method to combine two ciphers A and B to encrypt a plaintext to a corresponding ciphertext where selected parts of the plaintext will be encrypted with cipher A which offers augmented security through generating a ciphertext larger than the corresponding plaintext, and where the remaining parts of the plaintext will be encrypted with a block cipher B, which is generating ciphertext, block by block, where the size of the ciphertext block is the same as the plaintext block, such that the user achieves a desired balance between the security of the ciphertext and the burden of its augmented size, where the transmitter and the recipient of the encrypted message will both share the block cipher key, $K_b$, and the augmented cipher key, $K_a$, and where the block cipher will generate a succession of preliminary ciphertext blocks of size b bits each, and where the leftmost u≤b bits in each preliminary ciphertext block will be encrypted with cipher A which will generate from these u bits as a plaintext input an augmented ciphertext output of length of v>u bits, and where the remaining b-u bits from the preliminary ciphertext block will be concatenated to the augmented ciphertext to form the combined ciphertext block of size (c=b−u+v) bits, and where these combined ciphertext blocks will be transmitted, one by one, to the intended recipient; the intended recipient will decrypt the combined ciphertext blocks, block by block, specifically the reader will" remove from the combined ciphertext block the leftmost v bits, the augmented ciphertext, decrypt the augmented ciphertext to the corresponding cipher A plaintext input of size u bits, then concatenate to the cipher A plaintext, the (c−v) bits left in the combined ciphertext, to reconstruct the preliminary ciphertext comprising b=c−v+u bits, then decrypting the preliminary ciphertext with the block cipher, using $K_b$, and extracting the corresponding plaintext block; repeating the same for all the blocks in the transmitted message.

The above method may be further refined where the transmitter operates cipher A on the leftmost u bits of every preliminary ciphertext as a cipher A input, P, as follows:

(i) P is randomly parceled to q concatenated sections, where q is even:

$$P = Q_1 \| Q_2 \| \ldots Q_q$$

and where (ii) each Q for j=1, 2, . . . q is identified per its numeric value $v_j$ and the number of leading zeros thereto, $r_j$, and where one constructs a string R by concatenating 2q strings, where the first q strings are comprised of $(v_j+1)$ bit for j=1, 2, . . . q, and where the identities of the bits in each string are identical to each other and are opposite of the identities of the bits in the adjacent string, and where the second q strings are comprised of $(r_j+1)$ bit for j=1, 2, . . . q, and where the identities of the bits in each string are identical to each other, and are opposite of the identities of the bits in the adjacent strings and where the transmitter fits the output of cipher A to be a string of size v bits by:

(i) adding a header to P in the form 100 . . . 1 with one or arbitrary more '0' between the '1's, such that the intended reader will know how to remove this header regardless of how long it is, and by (ii) adding a trailer to P in the form 0111 . . . 0 with one or arbitrary more '1' bits between the '0's such that the intended reader will know how to remove this trailer regardless of how long it is, using this header and trailer to insure that the bit size of the corresponding cipher string C will be v bits.

and where P is encrypted by using $K_a$ to transpose P to C, and where one generates P from C by the reverse transposition of P to C, Another refinement is as follows: one adds s 'shadow strings' $S_1, S_2, \ldots S_s$ to R, where each shadow string is comprised $v_k+1=1$ bits and $r_k+1=1$ bits for k=1, 2, . . . s; these shadow strings may be added between or before any of the $Q_j$ strings in P.

What is claimed is:

1. A method comprising:
receiving, by a computing device, a plaintext message M;
selecting, by the computing device, n segments ($P_1$, $P_2$, $P_3$ . . . $P_n$) from the plaintext message M,
wherein n is a positive integer greater than or equal to two, and
wherein the selected n segments ($P_1$, $P_2$, $P_3$ . . . $P_n$) are a subset of the plaintext message M;
removing, by the computing device, each of the selected n segments ($P_1$, $P_2$, $P_3$ . . . $P_n$) from the plaintext message M; and
concatenating, by the computing device, remaining sections of plaintext message to a contiguous left-over message $M_l$;
for each of the selected n segments ($P_1$, $P_2$, $P_3$ . . . $P_n$):
identifying, by the computing device, a bit position value $t_i$, i=1, 2, . . . n,
wherein the bit position value $t_i$ denotes a bit position for each of the selected n segments ($P_1$, $P_2$, $P_3$ . . . $P_n$) relative to the plaintext message M;
generating, by the computing device, a concatenated segment $P^*_i$, i=1, 2, . . . n, for each of the selected n segments ($P_1$, $P_2$, $P_3$ . . . $P_n$),
wherein each of the concatenated segments $P^*_i$, i=1, 2, . . . n, is generated from concatenating a corresponding segment $P_i$, i=1, 2, . . . n, with a first header with h header bits corresponding to the bit position value $t_i$ and a first trailer bits, according to the formula $$P^*_i = [h \text{ bits indicating } t_i] \| P_i \| [\text{trailer bits}],$$

wherein the first trailer bits are set to 1 for i=1, 2, . . . (n−1), and 0 for i=n;
concatenating, by the computing device, a second header bits in the form of "1000 . . . 1" to each of the concatenated segments $P^*_i$, i=1, 2, . . . n, the second header bits comprise of an arbitrary number of numerical zeros between numerical ones;
concatenating, by the computing device, a second trailer bits in the form of "0111 . . . 0" to each of the concatenated segments $P^*_i$, i=1, 2, . . . n, the second trailer bits comprise an arbitrary number of numerical ones between numerical zeros, so as to update the each of the concatenated segments $P^*_i$, i=1, 2, . . . n;
encrypting, by the computing device, each of the updated concatenated segments $P^*_i$, i=1, 2, . . . n, using an augmented-ciphertext cipher A with an augmented cipher key $K_a$, and generating a corresponding ciphertext $C_i$, i=1, 2, . . . n, according to the formula $$C_i = \alpha(P^*_i, K_a),$$

where α denotes encryption with the augmented-ciphertext cipher A,
wherein each of the ciphertexts $C_i$, i=1, 2, . . . n, has same bit size;
for the contiguous left-over message $M_l$:
encrypting, by the computing device, the contiguous left-over message $M_l$ using a base cipher B with a base cipher key $K_b$, according to the formula $$C_l = \beta(M_l, K_b),$$

where β denotes encryption with the base cipher B,
wherein the base cipher B uses different encryption algorithm and encryption key from the augmented-ciphertext cipher A;
generating, by the computing device, a mixed ciphertext $C_m$ by concatenating the ciphertext $C_i$, i=1, 2, . . . n, and $C_l$ according to the formula $C_m = C_1 \| C_2 \| \ldots \| C_n \| C_l$; and
transmitting, by the computing device, the mixed ciphertext $C_m$ to an intended recipient.

* * * * *